(12) United States Patent
Choi et al.

(10) Patent No.: US 10,384,776 B2
(45) Date of Patent: Aug. 20, 2019

(54) TILTROTOR AIRCRAFT HAVING VERTICAL LIFT AND HOVER AUGMENTATION

(71) Applicant: Bell Helicopter Textron Inc., Fort Worth, TX (US)

(72) Inventors: Jouyoung Jason Choi, Fort Worth, TX (US); Daniel Bryan Robertson, Fort Worth, TX (US); Kirk Landon Groninga, Fort Worth, TX (US); Frank Bradley Stamps, Fort Worth, TX (US); Matthew Edward Louis, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 704 days.

(21) Appl. No.: 15/438,972

(22) Filed: Feb. 22, 2017

(65) Prior Publication Data
US 2018/0237136 A1    Aug. 23, 2018

(51) Int. Cl.
*B64C 39/00* (2006.01)
*B64C 3/32* (2006.01)
(Continued)

(52) U.S. Cl.
CPC .............. *B64C 39/005* (2013.01); *B64C 3/14* (2013.01); *B64C 3/32* (2013.01); *B64C 23/02* (2013.01);
(Continued)

(58) Field of Classification Search
CPC ..... B64C 39/005; B64C 39/003; B64C 23/02; B64C 29/0033; B64C 3/32; B64C 27/52;
(Continued)

(56) References Cited

U.S. PATENT DOCUMENTS

| 1,487,228 A | 3/1924 | Emilio |
| 1,666,132 A | 4/1928 | Maurice et al. |

(Continued)

FOREIGN PATENT DOCUMENTS

| CN | 204674831 U | 9/2015 |
| CN | 104276284 B | 4/2016 |

(Continued)

OTHER PUBLICATIONS

European Examination Report; Application No. 17208612.6; EPO; dated Aug. 10, 2018.
(Continued)

*Primary Examiner* — Valentina Xavier
(74) *Attorney, Agent, or Firm* — Lawrence Youst PLLC

(57) ABSTRACT

A tiltrotor aircraft has a fuselage and a wing having upper and lower surfaces with a plurality of channels extending therebetween, each with a cycloidal rotor mounted therein. At least two pylon assemblies are rotatably coupled to the wing to selectively operate the tiltrotor aircraft between helicopter and airplane flight modes. Each pylon assembly includes a mast and a proprotor assembly operable to rotate with the mast to generate thrust. At least one engine provides torque and rotational energy to the proprotor assemblies and the propulsion assemblies. Each of the cycloidal rotors has a plurality of blades that travels in a generally circular path and has a plurality of pitch angle configurations such that each cycloidal rotor is operable to generate a variable thrust and a variable thrust vector, thereby providing vertical lift augmentation, roll control, yaw control and/or pitch control in the helicopter flight mode.

19 Claims, 11 Drawing Sheets

(51) Int. Cl.
*B64C 3/14* (2006.01)
*B64D 27/12* (2006.01)
*B64D 27/26* (2006.01)
*B64C 29/00* (2006.01)
*B64C 27/26* (2006.01)
*B64C 27/28* (2006.01)
*B64C 27/52* (2006.01)
*B64C 23/02* (2006.01)

(52) U.S. Cl.
CPC .............. *B64C 27/26* (2013.01); *B64C 27/28* (2013.01); *B64C 27/52* (2013.01); *B64C 29/0033* (2013.01); *B64C 39/003* (2013.01); *B64D 27/12* (2013.01); *B64D 27/26* (2013.01); *B64C 2003/143* (2013.01); *B64D 2027/262* (2013.01); *Y02T 50/12* (2013.01)

(58) Field of Classification Search
CPC B64C 27/26; B64C 3/14; B64C 27/28; B64C 2003/143; B64D 27/26; B64D 27/12; B64D 2027/262; Y02T 50/12
See application file for complete search history.

(56) References Cited

U.S. PATENT DOCUMENTS

| | | | |
|---|---|---|---|
| 1,936,786 A | 11/1933 | Albert | |
| 2,402,311 A | 6/1946 | Bissett | |
| 2,444,781 A | 7/1948 | Leonard | |
| 2,479,125 A | 8/1949 | Leonard | |
| 2,526,941 A | 10/1950 | Meyer | |
| 2,604,276 A | 7/1952 | Huben | |
| 2,866,608 A | 12/1958 | Leonard | |
| 3,059,876 A | 10/1962 | Platt | |
| 3,159,361 A | 12/1964 | Weiland | |
| 3,178,131 A | 4/1965 | Nikolaus | |
| 3,212,735 A | 10/1965 | Nikolaus | |
| 4,165,058 A | 8/1979 | Whitener | |
| 4,194,707 A | 3/1980 | Sharpe | |
| 5,100,080 A * | 3/1992 | Servanty | B64C 39/005 244/70 |
| 5,176,338 A | 1/1993 | Silich | |
| 5,205,512 A | 4/1993 | Rumberger | |
| 5,265,827 A * | 11/1993 | Gerhardt | B64C 39/005 244/20 |
| 5,289,994 A | 3/1994 | Aguilera | |
| 6,007,021 A | 12/1999 | Tsepenyuk | |
| 7,518,864 B2 | 4/2009 | Kimura | |
| 7,594,625 B2 | 9/2009 | Robertson et al. | |
| 7,641,144 B2 | 1/2010 | Kummer et al. | |
| 7,654,486 B2 | 2/2010 | Milde, Jr. | |
| 7,731,121 B2 | 6/2010 | Smith et al. | |
| 7,931,233 B2 | 4/2011 | Arafat et al. | |
| 8,469,308 B2 | 6/2013 | Robertson et al. | |
| 8,596,570 B1 | 12/2013 | Carambat | |
| 8,636,243 B2 | 1/2014 | Robertson | |
| 8,727,265 B2 | 5/2014 | Altmikus et al. | |
| 9,260,185 B2 | 2/2016 | Covington et al. | |
| 9,409,643 B2 | 8/2016 | Mores et al. | |
| 9,452,832 B2 | 9/2016 | Heid | |
| 9,789,959 B2 | 10/2017 | Prisell | |
| 2006/0054736 A1 | 3/2006 | Milde | |
| 2006/0151666 A1 | 7/2006 | VanderMey et al. | |
| 2006/0249621 A1 | 11/2006 | Stephens | |
| 2007/0200029 A1 | 8/2007 | Sullivan | |
| 2011/0121128 A1 | 5/2011 | Balkus, Jr. | |
| 2011/0315809 A1 | 12/2011 | Oliver | |
| 2012/0091257 A1 | 4/2012 | Wolff et al. | |
| 2012/0111994 A1 | 5/2012 | Kummer et al. | |
| 2012/0256042 A1 | 10/2012 | Altmikus et al. | |
| 2012/0312916 A1 | 12/2012 | Groninga | |
| 2013/0026303 A1 | 1/2013 | Wang | |
| 2013/0119186 A1 | 5/2013 | Heid | |
| 2015/0048214 A1 | 2/2015 | Bockmiller et al. | |
| 2015/0183518 A1 | 7/2015 | Stuckl et al. | |
| 2015/0191245 A1 | 7/2015 | Mores et al. | |
| 2015/0197335 A1 | 7/2015 | Dekel et al. | |
| 2015/0225071 A1 | 8/2015 | Tighe | |
| 2015/0314865 A1 | 11/2015 | Bermond et al. | |
| 2016/0016652 A1 | 1/2016 | Barrett et al. | |
| 2016/0214710 A1 | 7/2016 | Brody et al. | |
| 2017/0003690 A1 | 1/2017 | Tanahashi | |
| 2017/0152935 A1 | 6/2017 | Filter et al. | |
| 2017/0361927 A1 | 12/2017 | Lavagen et al. | |
| 2019/0023393 A1 * | 1/2019 | Schwaiger ............ B64C 11/006 |

FOREIGN PATENT DOCUMENTS

| | | |
|---|---|---|
| EP | 2511177 A1 | 10/2012 |
| FR | 636843 A | 4/1928 |
| FR | 880130 A | 3/1943 |
| FR | 2375090 A1 | 7/1978 |
| GB | 885663 A | 12/1961 |
| GB | 2316374 A | 2/1998 |
| JP | 2009051381 A | 3/2009 |

OTHER PUBLICATIONS

European Search Report; Application No. 17208612.6; EPO; dated Jul. 25, 2018.

* cited by examiner

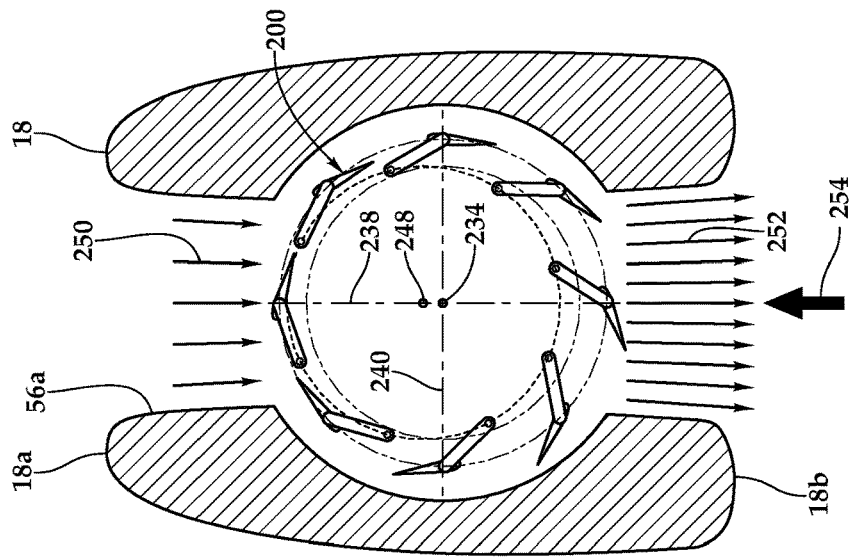
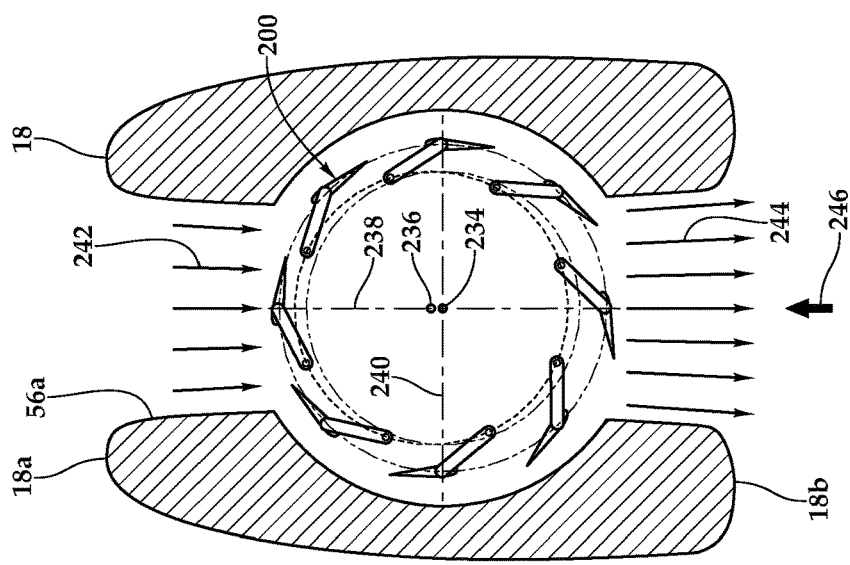
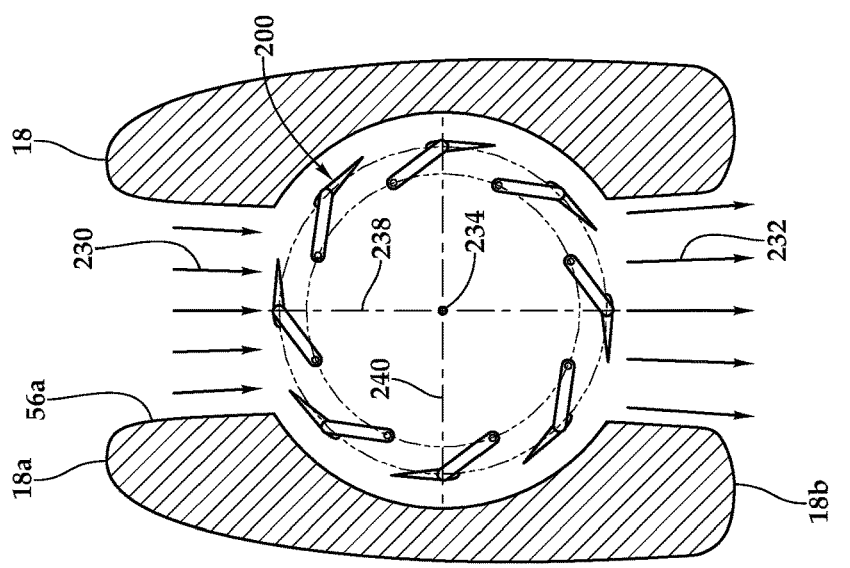

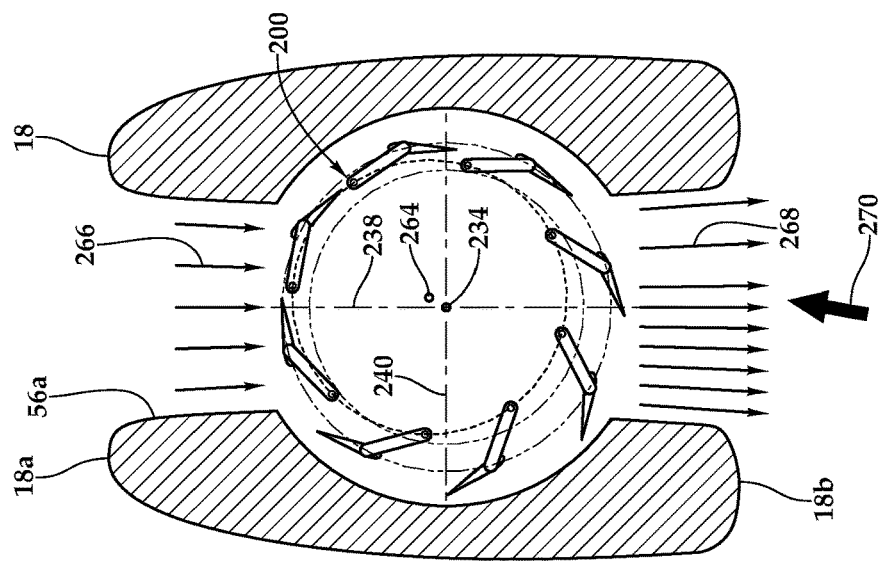
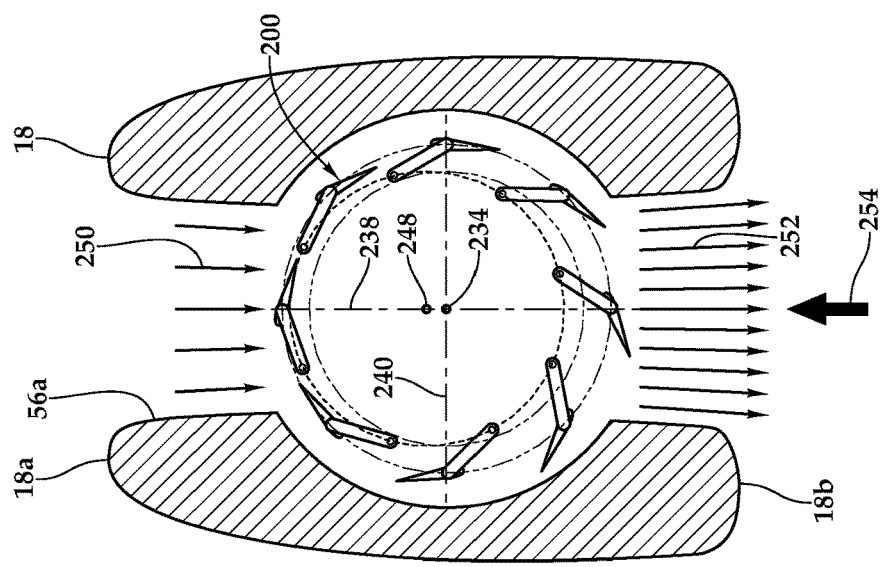
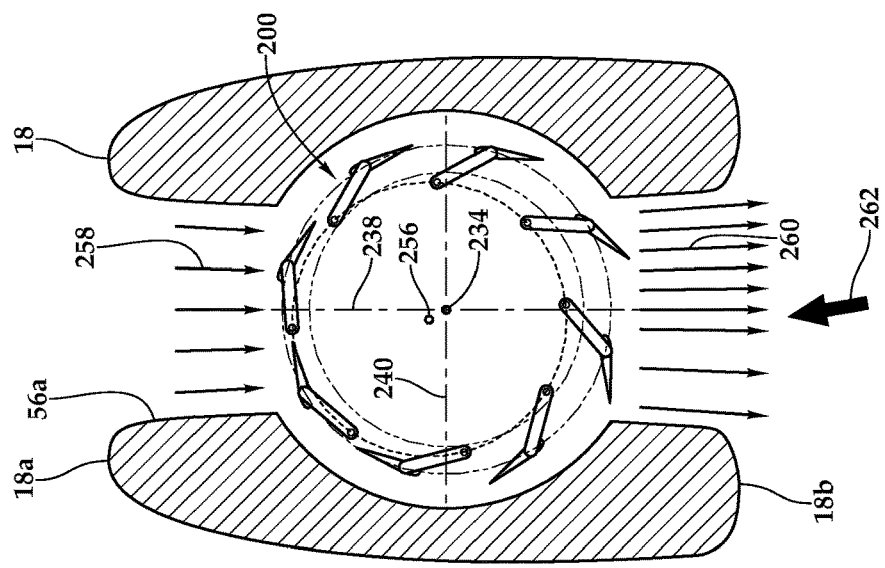

TILTROTOR AIRCRAFT HAVING VERTICAL LIFT AND HOVER AUGMENTATION

TECHNICAL FIELD OF THE DISCLOSURE

The present disclosure relates, in general, to tiltrotor aircraft operable for vertical takeoff and landing in a helicopter flight mode and forward cruising in an airplane flight mode and, in particular, to tiltrotor aircraft having vertical lift and hover augmentation in helicopter flight mode provided by wing mounted cycloidal rotors.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that conventional proprotor designs have been a compromise between meeting the high thrust requirements in helicopter flight mode, which requires large proprotors, and optimizing forward flight in airplane flight mode.

SUMMARY

In a first aspect, the present disclosure is directed to a tiltrotor aircraft having a helicopter flight mode and an airplane flight mode. The tiltrotor aircraft includes a fuselage and a wing that is supported by the fuselage. The wing has upper and lower surfaces with a plurality of channels extending therebetween. A plurality of propulsion assemblies is respectively disposed within the channels of the wing. At least two pylon assemblies are rotatably coupled to the wing to selectively operate the tiltrotor aircraft between the helicopter flight mode and the airplane flight mode. Each pylon assembly includes a mast and a proprotor assembly that is operable to rotate with the mast to generate thrust. At least one engine provides torque and rotational energy to the proprotor assemblies and the propulsion assemblies.

In some embodiments, the propulsion assemblies may provide vertical lift and hover augmentation to the proprotor assemblies in the helicopter flight mode. In certain embodiments, each of the propulsion assemblies may include a cycloidal rotor having a plurality of blade that is operable to provide a vertical thrust, operable to provide a variable thrust and/or operable to provide a variable thrust vector. In such embodiments, the blades of each cycloidal rotor may travel along a generally circular path and may have a plurality of pitch angle configurations. In some embodiments, the propulsion assemblies may be distributed generally spanwise within the wing. In other embodiments, the propulsion assemblies may include a forward plurality of propulsion assemblies and an aft plurality of propulsion assemblies.

In certain embodiments, the propulsion assemblies may be operable to generate vertical thrust to augment the thrust of the proprotor assemblies in the helicopter flight mode, operable to generate thrust to perform lateral transitions in the helicopter flight mode, operable to provide roll control in the helicopter flight mode, operable to provide yaw control in the helicopter flight mode and/or operable to provide pitch control in the helicopter flight mode. In some embodiments, the tiltrotor aircraft may include at least one engine dedicated to the propulsion assemblies. In certain embodiments, the tiltrotor aircraft may include aerodynamic covers operable to close the channels of the wing in the airplane flight mode.

In a second aspect, a tiltrotor aircraft has a helicopter flight mode and an airplane flight mode. The tiltrotor aircraft includes a fuselage and a wing that is supported by the fuselage. The wing has upper and lower surfaces with a plurality of channels extending therebetween. A plurality of cycloidal rotors is respectively disposed within the channels of the wing. At least two pylon assemblies are rotatably coupled to the wing to selectively operate the tiltrotor aircraft between the helicopter flight mode and the airplane flight mode. Each pylon assembly includes a mast and a proprotor assembly that is operable to rotate with the mast to generate thrust. At least one engine provides torque and rotational energy to the proprotor assemblies and the propulsion assemblies. Each of the cycloidal rotors has a plurality of blades that travels in a generally circular path and has a plurality of pitch angle configurations such that each cycloidal rotor is operable to generate a variable thrust and a variable thrust vector, thereby providing vertical lift and hover augmentation to the proprotor assemblies in the helicopter flight mode.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 6A-6C are cross sectional views of a wing mounted cycloidal rotor of a tiltrotor aircraft having vertical lift and hover augmentation in helicopter flight mode in accordance with embodiments of the present disclosure;

FIGS. 7A-7C are cross sectional views of a wing mounted cycloidal rotor of a tiltrotor aircraft having vertical lift and hover augmentation in helicopter flight mode in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
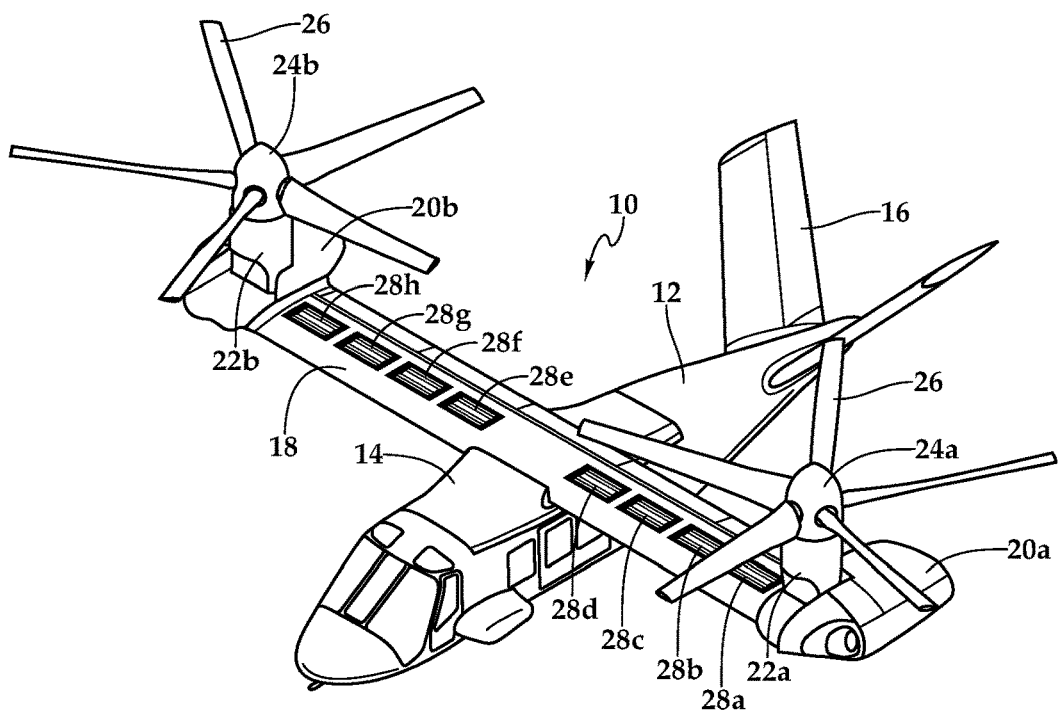
FIGS. 1A-1C are schematic illustrations of a tiltrotor aircraft having vertical lift and hover augmentation in helicopter flight mode in accordance with embodiments of the present disclosure.
Figure 1B:
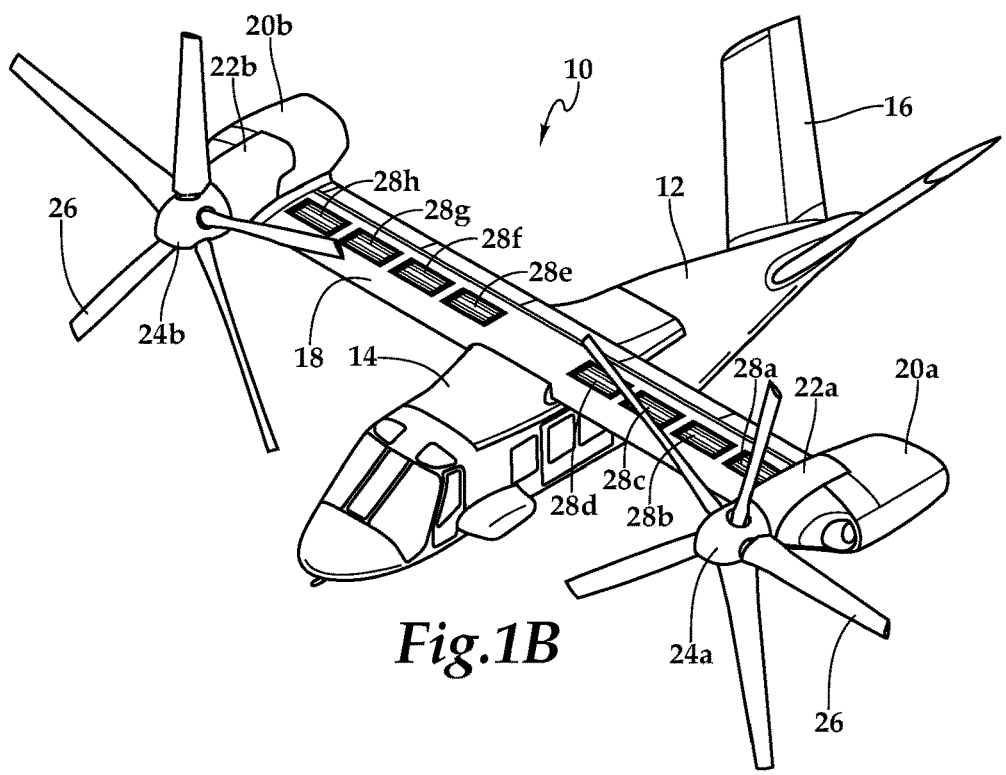
Figure 1C:
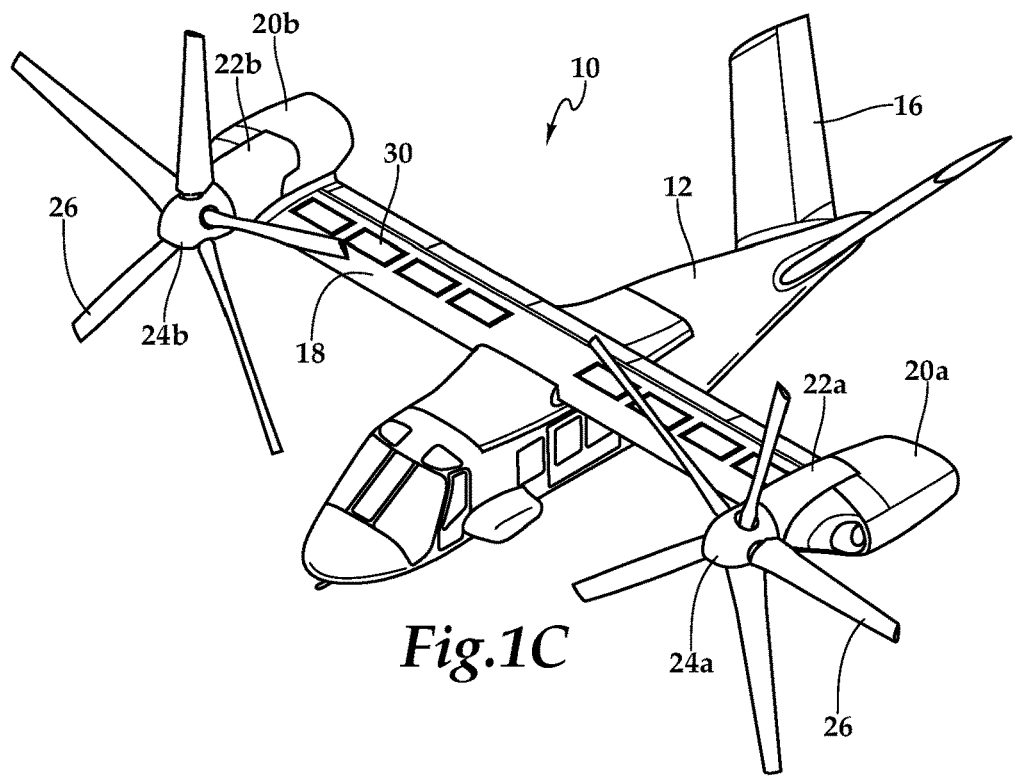

Referring to FIGS. 1A-1C in the drawings, a tiltrotor aircraft is schematically illustrated and generally designated 10. Aircraft 10 includes a fuselage 12, a wing mount assembly 14 that is rotatable relative to fuselage 12 and a tail assembly 16 having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are fixed nacelles 20a, 20b, each of which preferably houses an engine and a fixed portion of a drive system. A pylon assembly 22a is rotatable relative to fixed nacelle 20a and wing 18 between a generally vertical orientation, as best seen in FIG. 1A, a generally horizontal orientation, as best seen in FIG. 1B. Pylon assembly 22a includes a rotatable portion of the drive system and a proprotor assembly 24a that is rotatable responsive to torque and rotational energy provided via the engine and drive system. Likewise, a pylon assembly 22b is rotatable relative to fixed nacelle 20b and wing 18 between a generally vertical orientation, as best seen in FIG. 1A, a generally horizontal orientation, as best seen in FIG. 1B. Pylon assembly 22b includes a rotatable portion of the drive system and a proprotor assembly 24b that is rotatable responsive to torque and rotational energy provided via the engine and drive system. In the illustrated embodiment, proprotor assemblies 24a, 24b each include five proprotor blades 26. It should be understood by those having ordinary skill in the art, however, that proprotor assemblies 24a, 24b could alternatively have a different number of proprotor blades, either less than or greater than five. Distributed generally spanwise within wing 18 is a plurality of propulsion assemblies depicted as cycloidal rotors 28a-28h. In the illustrated embodiment, four cycloidal rotors 28a-28d are located in wing 18 to the left side of fuselage 12 and four cycloidal rotors 28e-28h are located in wing 18 to the right side of fuselage 12. It should be understood by those having ordinary skill in the art, however, that each side of wing 18 could alternatively have a different number of cycloidal rotors, either less than or greater than four, positioned spanwise or in another suitable configuration.

Cycloidal rotors 28a-28h provide vertical lift and hover augmentation to tiltrotor aircraft 10 in the helicopter flight mode. Vertical thrust generated by cycloidal rotors 28a-28h is operable to provide vertical lift augmentation tiltrotor aircraft 10. This reduces the vertical thrust requirement of proprotor assemblies 24a, 24b, thereby enabling proprotor assemblies 24a, 24b to be tailored more toward the higher inflow and lower blade loading environment experience by proprotor assemblies 24a, 24b in the forward flight mode of tiltrotor aircraft 10. For example, the tailoring of proprotor assemblies 24a, 24b may include the use of shorter proprotor blades, the uses of proprotor blades having greater twist and/or the use of a greater number of proprotor blades on each proprotor assembly, to name a few. Thrust vectoring by cycloidal rotors 28a-28h is operable to provide hover augmentation to tiltrotor aircraft 10. This reduces or eliminates the thrust vectoring requirement of proprotor assemblies 24a, 24b, thereby reducing the complexity of proprotor operation and the proprotor control system including, for example, elimination of the cyclic operation and cyclic control system of proprotor assemblies 24a, 24b. In addition, cycloidal rotors 28a-28h reduce the download on wing 18 during hover operations by ingesting a portion of the hover column of air deflected by proprotor assemblies 24a, 24b that would typically be blocked by wing 18, which improves the hover efficiency of tiltrotor aircraft 10.

FIG. 1A illustrates aircraft 10 in helicopter or VTOL flight mode, in which proprotor assemblies 24a, 24b are rotating in a substantially horizontal plane to provide a lifting thrust, such that aircraft 10 flies much like a conventional helicopter, with the addition of cycloidal rotors 28a-28h providing vertical lift and hover augmentation. FIGS. 1B and 1C illustrate aircraft 10 in airplane or forward flight mode, in which proprotor assemblies 24a, 24b are rotating in a substantially vertical plane to provide a forward thrust enabling wing 18 to provide a lifting force responsive to forward airspeed, such that aircraft 10 flies much like a conventional propeller driven aircraft. In FIG. 1B, cycloidal rotors 28a-28h are exposed and may be operated if desired to pass air through wing 18 at a desired rate or may be allowed to freewheel responsive to airflow across wing 18. Alternatively, as depicted in FIG. 1C, covers 30 may be hydraulically actuated to provide aerodynamic surfaces substantially coincident with the upper and lower skins of wing 18 when it is not desired to have cycloidal rotors 28a-28h exposed.

During all flight modes, proprotor assemblies 24a, 24b rotate in opposite directions to provide torque balancing to aircraft 10. For example, when viewed from the front of aircraft 10 in forward flight mode, proprotor assembly 24a rotates clockwise and proprotor assembly 24b rotates counterclockwise. It should be appreciated that aircraft 10 can be operated such that proprotor assemblies 24a, 24b are selectively positioned between airplane flight mode and helicopter flight mode, which can be referred to as a conversion flight mode. Further, it should be understood by those having ordinary skill in the art that even though the present embodiments are illustrated in the context of tiltrotor aircraft 10, the embodiments of the present disclosure can be implemented on other types of tiltrotor aircraft including, for example, quad tiltrotor aircraft, unmanned tiltrotor aircraft and blended wing body aircraft, to name a few.

Figure 2A:
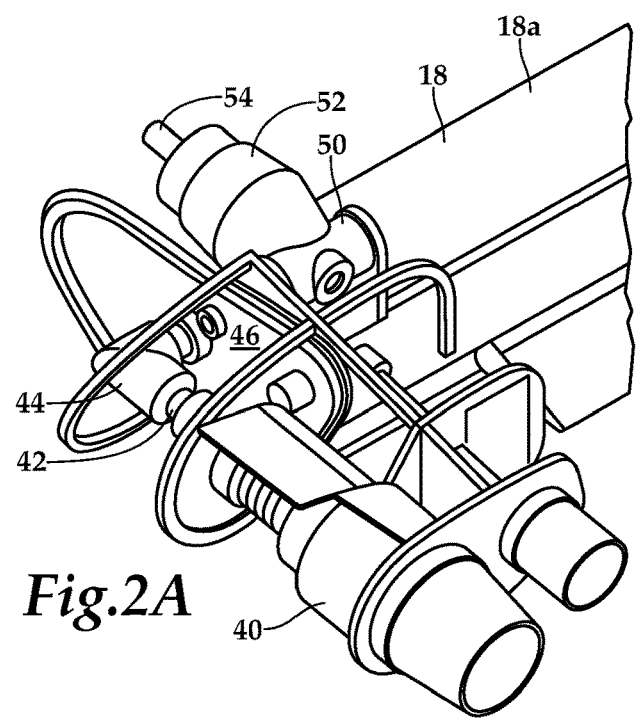
FIGS. 2A-2C are schematic illustrations of an engine, a drive system and a wing of a tiltrotor aircraft having vertical lift and hover augmentation in helicopter flight mode in accordance with embodiments of the present disclosure.
Figure 2B:
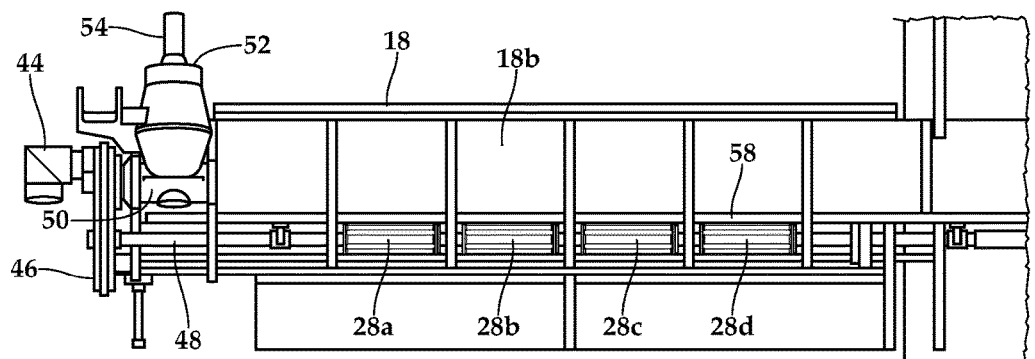
Figure 2C:
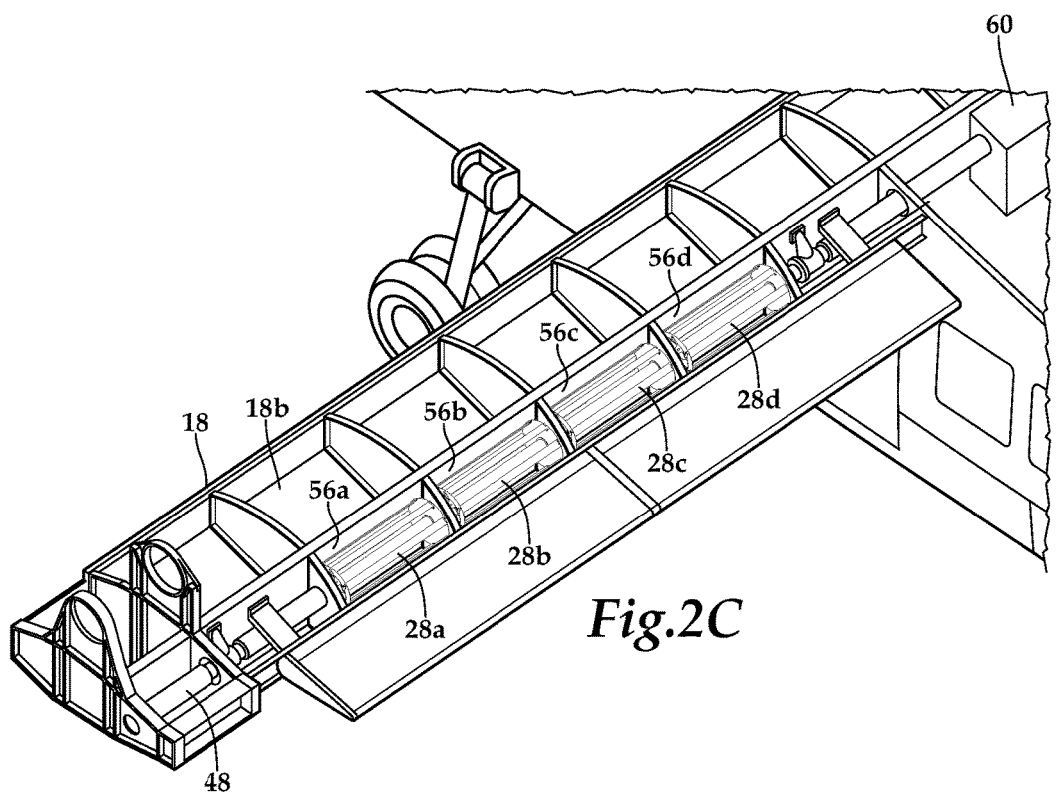
Figure 3A:
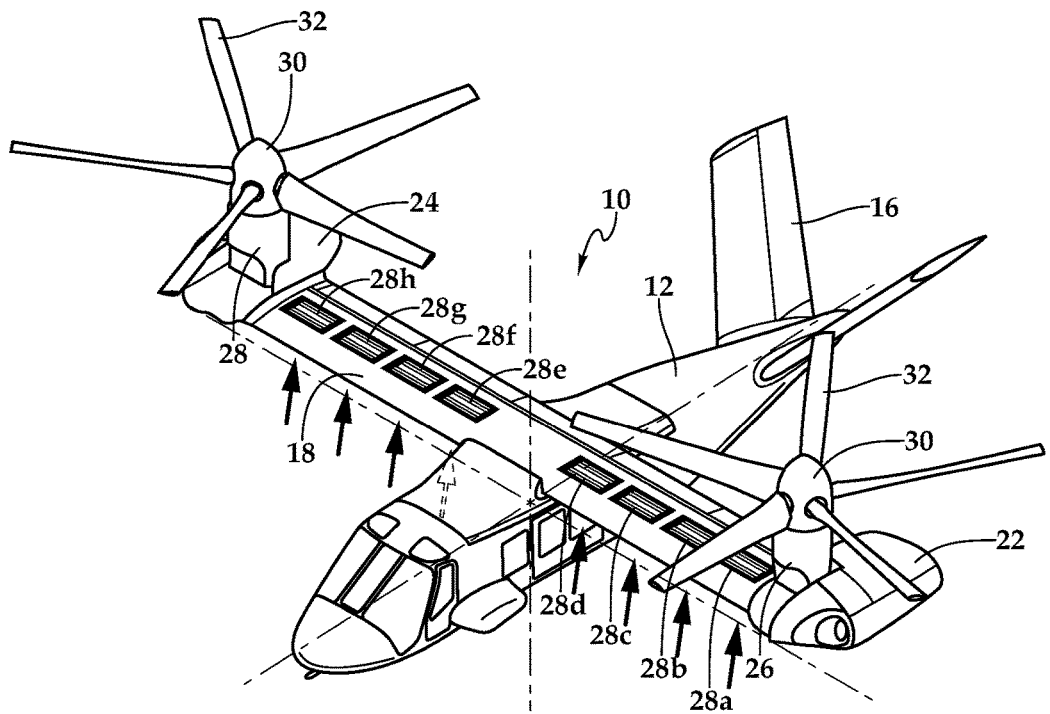
FIGS. 3A-3F are schematic illustrations of a tiltrotor aircraft having vertical lift and hover augmentation in helicopter flight mode in accordance with embodiments of the present disclosure.
Figure 3B:
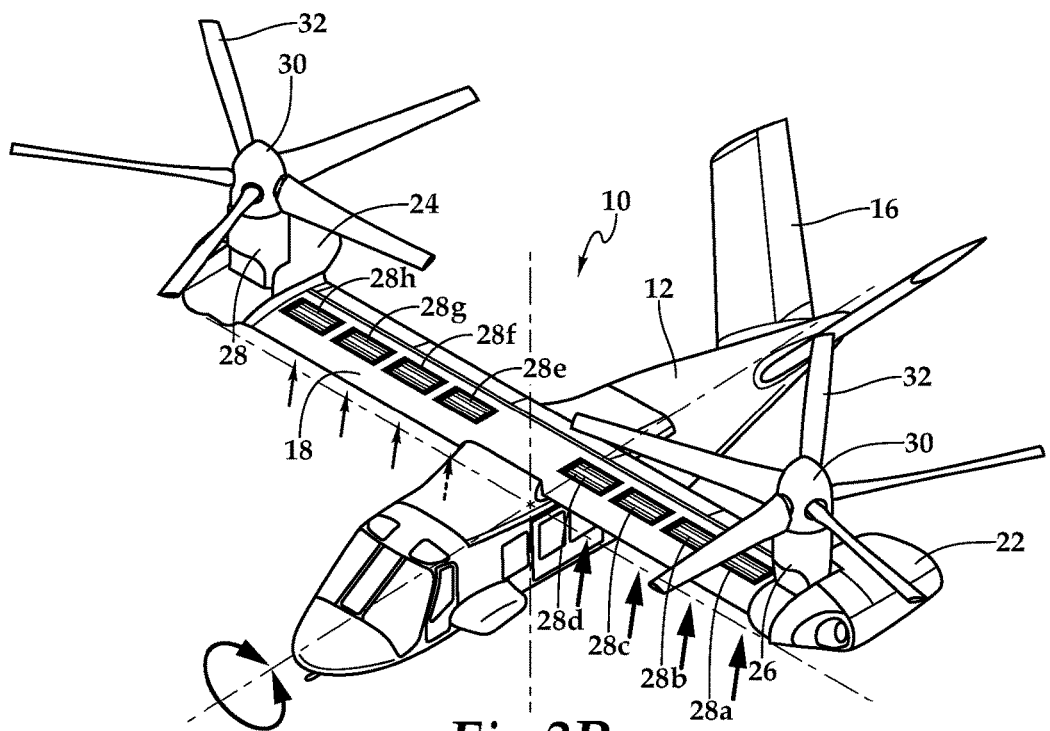
Figure 3C:
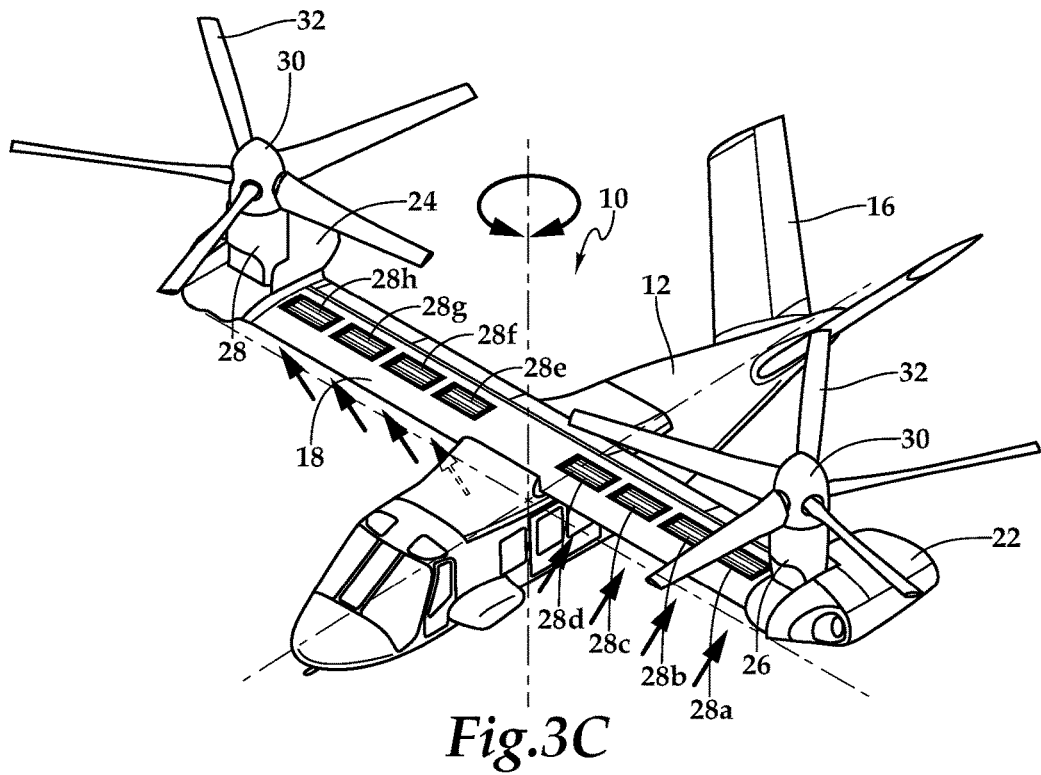
Figure 3D:
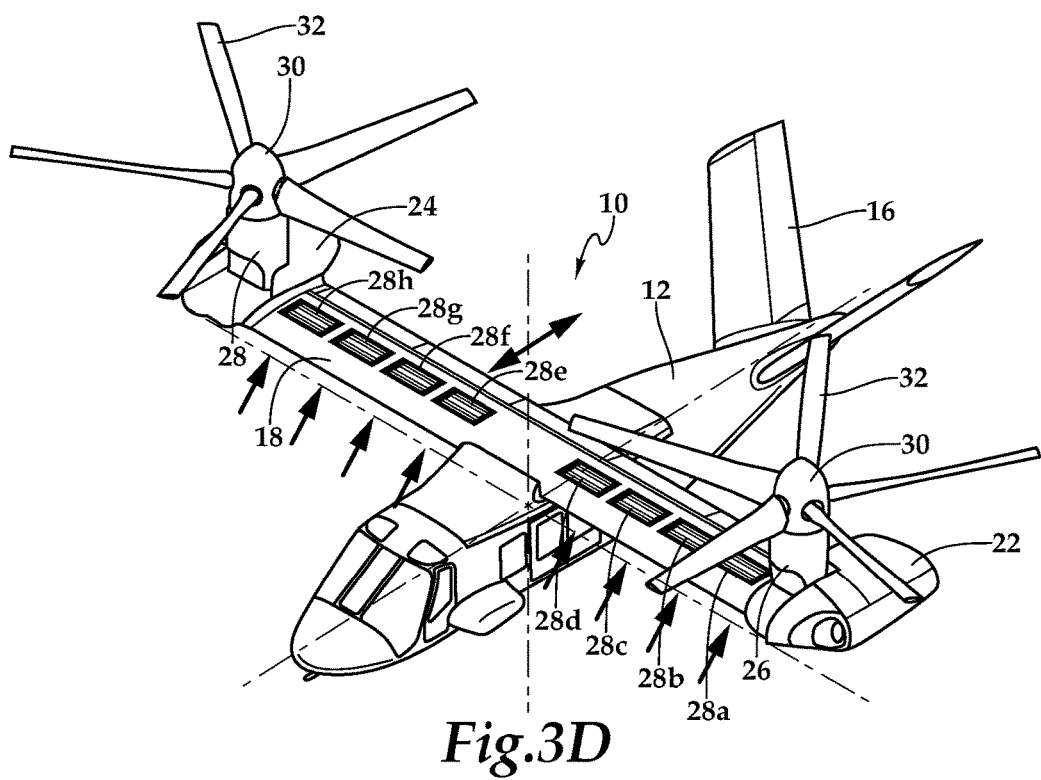
Figure 3E:
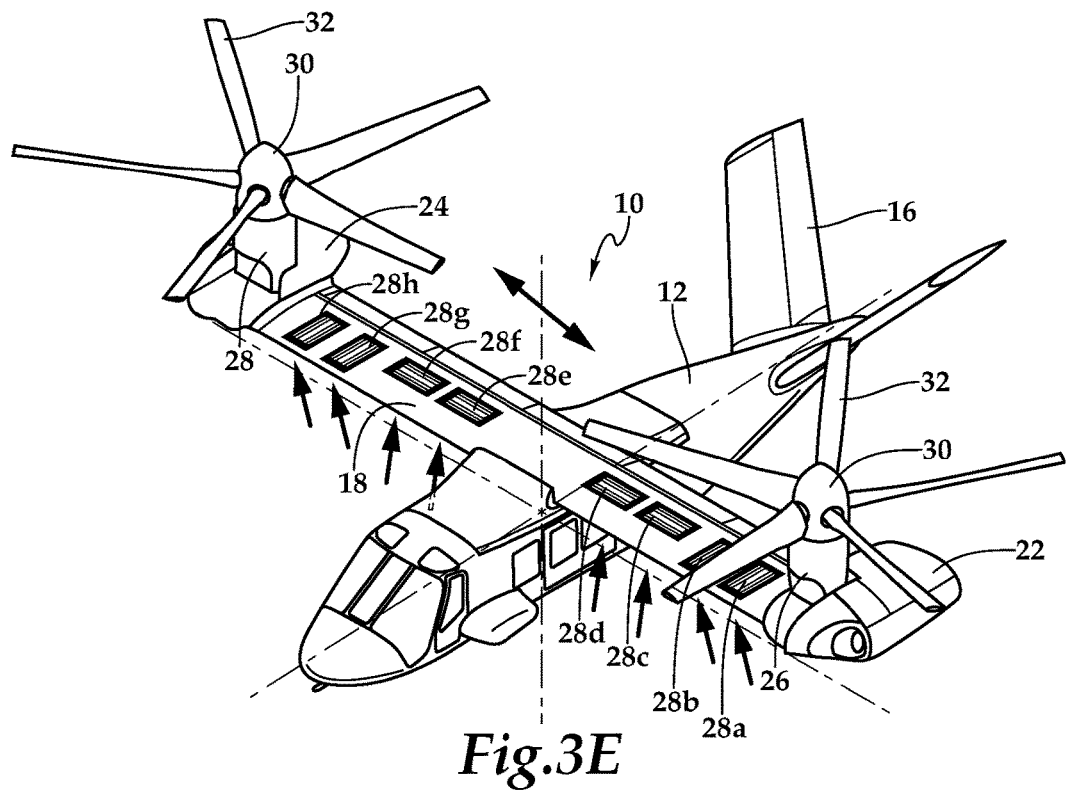
Figure 3F:
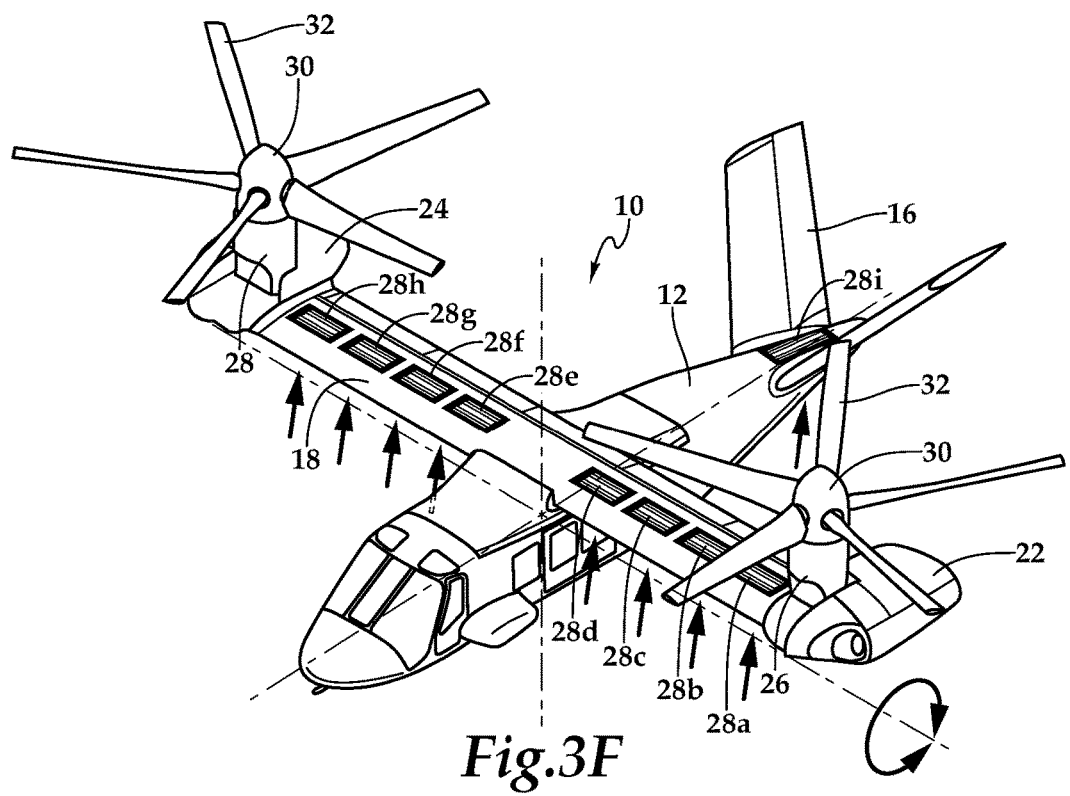

Referring now to FIGS. 2A-2C of the drawings, a drive system of tiltrotor aircraft 10 is disclosed in further detail. As best seen in FIG. 2A, the drive system includes an engine 40 that is fixed relative to wing 18. An engine output shaft 42 transfers power from engine 40 to a spiral bevel gearbox 44 that includes spiral bevel gears to change torque direction by 90 degrees from engine 40 to a fixed gearbox 46. Fixed gearbox 46 includes a plurality of gears, such as helical gears, in a gear train that are coupled to a drive shaft 48 and an output shaft (not visible) that transfers torque from fixed gearbox 46 to spindle gearbox 50, which is part of proprotor gearbox 52. As used herein, the term "coupled" may include direct or indirect coupling by any means, including moving and/or non-moving mechanical connections. Proprotor gearbox 46 is configured to transfer power and reduce speed to mast 54 that is operable to rotate a proprotor assembly (not pictured). In this manner, engine 40 provides torque and rotational energy to a proprotor assembly.

Drive shaft 48 provides a torque path that enables rotation of the propulsion assemblies depicted as cycloidal rotors 28a-28d. In the illustrated embodiment, cycloidal rotors 28a-28d are respectively disposed in individual channels 56a-56d that extend between an upper surface 18a and a lower surface 18b of wing 18 aft of wing spar 58 (note that upper surface 18a has been removed for clarity in FIGS. 2B, 2C). In this manner, engine 40 provides torque and rotational energy to cycloidal rotors 28a-28d. Alternatively or additionally, cycloidal rotors 28a-28d may receive torque and rotational energy from a dedicated engine, such as engine 60 located in fuselage 12, which may be a liquid fuel powered engine or an electric motor.

Referring to FIGS. 3A-3F of the drawings, helicopter flight mode operations of tiltrotor aircraft 10 using vertical lift and hover augmentation will now be described. Cycloidal rotors 28a-28h generate vertical thrust for tiltrotor aircraft 10 to provide vertical lift augmentation to proprotor assemblies 24a, 24b when tiltrotor aircraft 10 is in helicopter flight mode, as indicated by the large vertical arrows in FIG. 3A. The vertical lift augmentation is particularly useful during vertical takeoff, vertical landing and hover but may also be useful during other operations in helicopter flight mode as well as airplane flight mode, if desired. Cycloidal rotors 28a-28h also enabling certain maneuvers in the helicopter flight mode of tiltrotor aircraft 10, which are collectively referred to herein as "hover augmentation." It is noted that the term "hover augmentation" does not imply that tiltrotor aircraft 10 remains in one place in the air during such maneuvers but rather that tiltrotor aircraft 10 is configured in the helicopter flight mode during the maneuvers such as changing elevation, moving laterally, moving forward, moving backwards or the like. Operation of cycloidal rotors 28a-28h can enable roll control over tiltrotor aircraft 10 by selectively providing a greater vertical thrust on one side of tiltrotor aircraft 10 as compared to the other side of tiltrotor aircraft 10, as indicated by the large vertical arrows associated with cycloidal rotors 28a-28d and the small vertical arrows associated with cycloidal rotors 28e-28h in FIG. 3B.

Through the use of thrust vectoring, cycloidal rotors 28a-28h provide additional hover augmentation capability to tiltrotor aircraft 10. Operation of cycloidal rotors 28a-28h can enable yaw control over tiltrotor aircraft 10 by selectively providing a forward thrust component on one side of tiltrotor aircraft 10 and an aft thrust component on the other side of tiltrotor aircraft 10, as indicated by the large arrows with an aft component associated with cycloidal rotors 28a-28d and the large arrows with a forward component associated with cycloidal rotors 28e-28h in FIG. 3C. Operation of cycloidal rotors 28a-28h can enable fore/aft control over tiltrotor aircraft 10 by selectively providing a forward or an aft thrust component on both sides of tiltrotor aircraft 10, as indicated by the large arrows with an aft component associated with cycloidal rotors 28a-28h in FIG. 3D. In an alternate configuration of tiltrotor aircraft 10, operation of cycloidal rotors 28a-28h can enable lateral control over tiltrotor aircraft 10 by selectively providing a lateral thrust component on both sides of tiltrotor aircraft 10, as indicated by the large arrows with a lateral component associated with cycloidal rotors 28a, 28b, 28g, 28h, which have been oriented generally chordwise relative to wing 18 in FIG. 3E. In another alternate configuration of tiltrotor aircraft 10, operation of cycloidal rotors 28a-28i can enable pitch control over tiltrotor aircraft 10 by selectively providing a vertical thrust component generated proximate an aft location of tiltrotor aircraft 10, as indicated by the large vertical arrow associated with cycloidal rotor 28i in FIG. 3F. Even though the cycloidal rotors of the present disclosure have been discussed in terms of providing vertical lift or a vertical thrust in the up direction, those having ordinary skill in the art will recognize that the cycloidal rotors of the present disclosure are capable of not only providing a variable thrust intensity, in the vertical direction, but also a reversible thrust such that vertical thrust in the down direction can also be generated. This feature is important for cycloidal rotor 28i in FIG. 3F, as pitch control over tiltrotor aircraft 10 will require variable and reversible thrust capability.

Figure 4A:
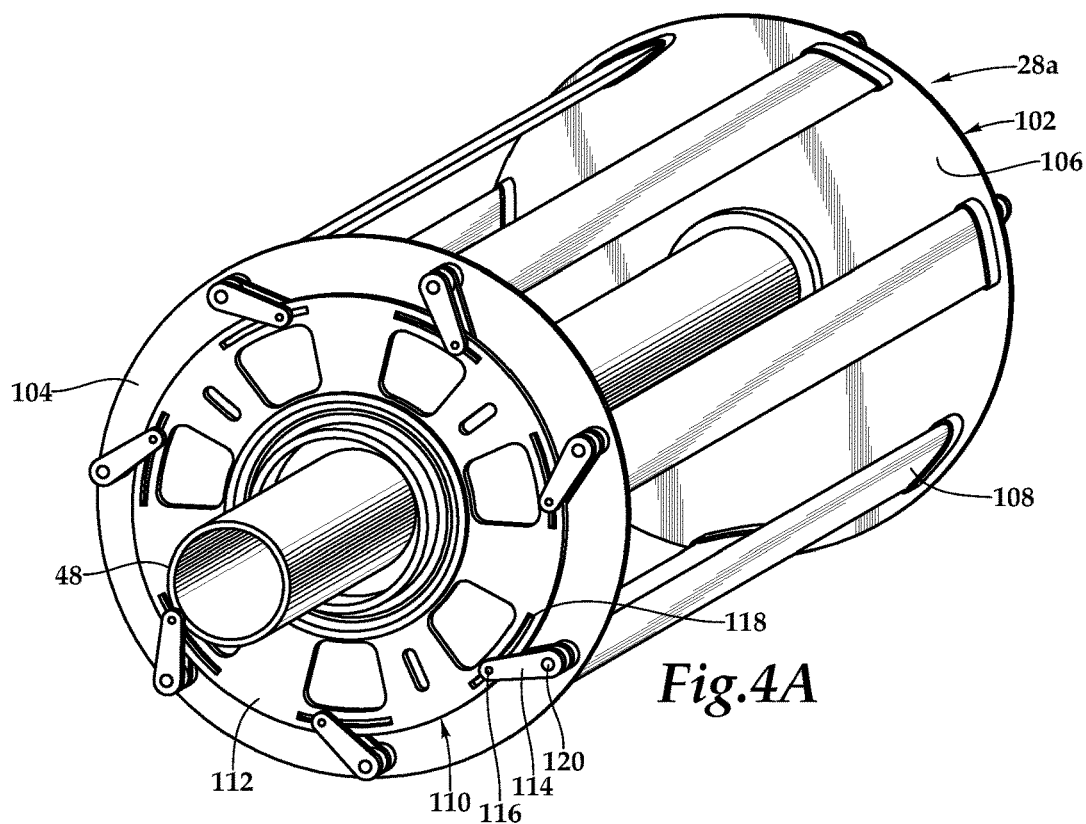
FIGS. 4A-4C are various views of a cycloidal rotor for use in a tiltrotor aircraft having vertical lift and hover augmentation in helicopter flight mode in accordance with embodiments of the present disclosure.
Figure 4B:
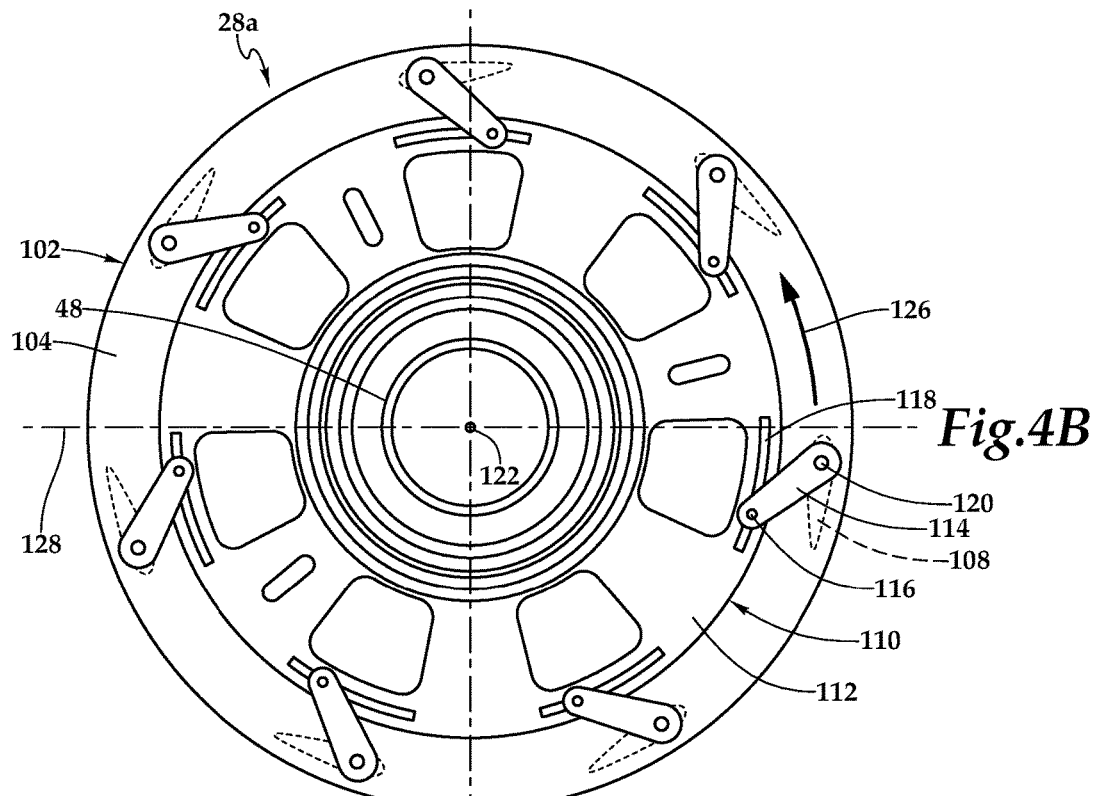
Figure 4C:
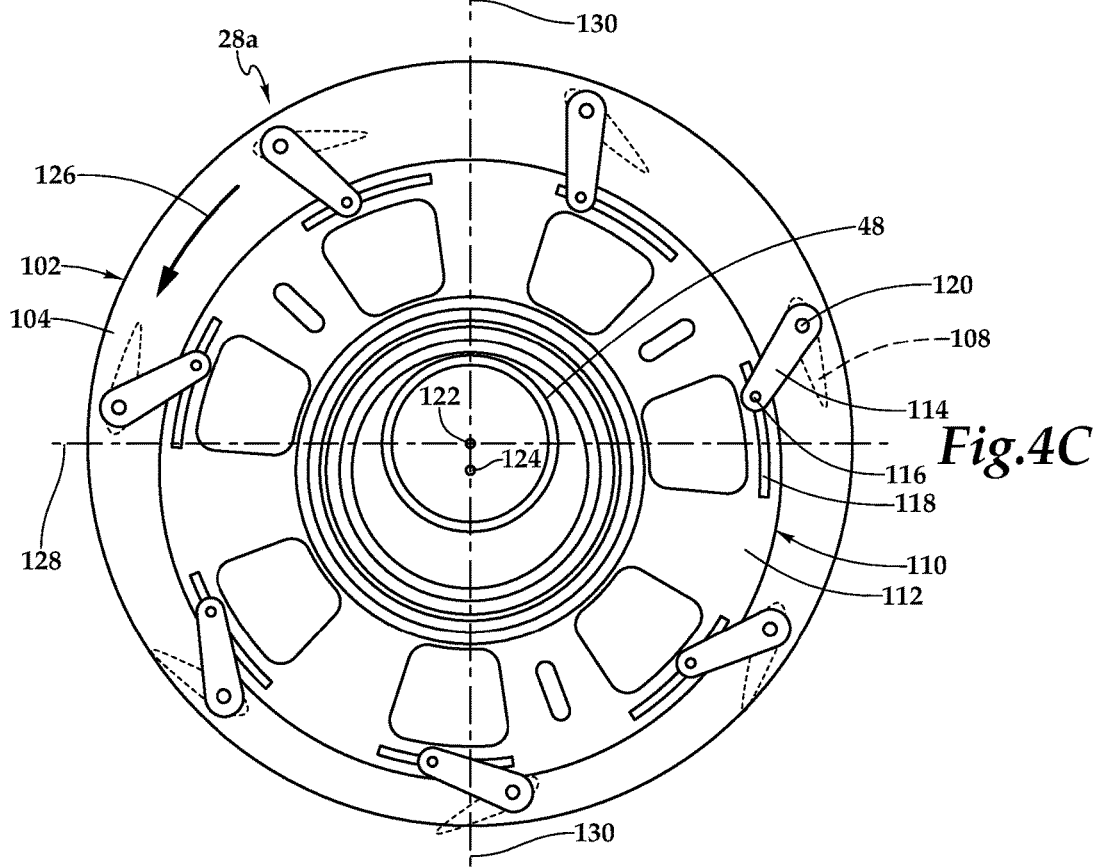

Referring to FIGS. 4A-4C of the drawings, a propulsion assembly for use in a tiltrotor aircraft of the present disclosure is depicted as cycloidal rotor 28A. Cycloidal rotor 28A includes a rotor assembly 102 including driver plates 104, 106 which are coupled to and are rotatable about a longitudinal axis by drive shaft 48. Drive shaft 48 is part of a drive system used to provide rotational energy to rotor assembly 102 and is, for example, coupled to engine 40 and/or engine 60 of tiltrotor aircraft 10. Rotor assembly 102 includes a plurality of blades 108 that are each rotatably coupled between driver plates 104, 106. As illustrated, blades 108 are disposed radially outwardly from the longitudinal axis such that blades 108 follow a generally circular path of travel when rotor assembly 102 rotates about the longitudinal axis. Cycloidal rotor 28A includes a control assembly 110 that is coupled to each blade 108. Control assembly 110 is part of an actuation system used to adjust the thrust output and thrust vector of rotor assembly 102 and is preferably coupled to an electrically operated actuator controlled by the flight control system and/or pilot input. In the illustrated embodiment, control assembly 110 includes a control cam 112 that is rotatable with and eccentrically shiftable relative to rotor assembly 102. Control assembly 110 also includes a plurality of linkages 114 that are slidably coupled to control cam 112 via follower pins 116 in follower slots 118 of driver plate 104 and fixably coupled to blades 108 via driver pins 120 that extend through linkage holes (not visible) of driver plate 104.

When rotor assembly 102 is rotated by drive shaft 48 and control cam 112 is positioned concentrically with rotor assembly 102, as best seen in FIG. 4B, follower pins 126 do not move relative to follower slots 128 and blades 128 do not rotate relative to driver plates 104, 106. In this state, blades 108 are in a neutral configuration wherein blades 108 have a substantially zero pitch during the entire revolution of rotor assembly 102. In this neutral configuration, blades 108 have a substantially zero angle of attack and therefore produce little or no thrust. To produce thrust, blades 108 are rotated relative to driver plates 104, 106 in response to shifting control cam 112 to an eccentric position, such as a downward position, relative to rotor assembly 102, as best seen in FIG. 4C. When control cam 112 is position eccentrically relative to rotor assembly 102 and rotor assembly 102 is rotated by drive shaft 48, follower pins 116 cyclically slide within follower slots 118 which cyclically pivot linkages 114 and cyclically rotates blades 118 relative to driver plates 104, 106. In the illustrated configuration, the center of rotation of control cam 112 has been shifted down from a concentric location 122 to an eccentric location 124. In this configuration, as each blade 108 follows the generally circular path of travel, the blades transition between positive pitch, zero pitch, negative pitch, zero pitch and back to positive pitch during each revolution of rotor assembly 102.

As illustrated, blades 108 have an airfoil cross section and travel in a counterclockwise direction as indicated by arrow 126. As best seen in FIG. 4C, as blades 108 approach the top of rotor assembly 102, the blades have progressively greater positive pitch reaching a maximum positive pitch proximate axis 130. Thereafter, as blades 108 retreat from the top of rotor assembly 102, the blades have progressively lesser positive pitch reaching zero pitch proximate axis 128. As blades 108 approach the bottom of rotor assembly 102, the blades have progressively greater negative pitch reaching a maximum negative pitch proximate axis 130. Thereafter, as blades 108 retreat from the bottom of rotor assembly 102, the blades have progressively lesser negative pitch, reaching zero pitch proximate axis 128. Each blade 108 repeats this cycle on each revolution of rotor assembly 102. It should be noted that while each blade 108 may have a different pitch angle at any given time, the collective positions of all blades 108 may be referred to herein as the pitch angle configuration of rotor assembly 102. Thus, movement of control cam 112 is operable to change the pitch angle configuration of blades 108 to selectively generate a variable and reversible vertical thrust with vertical movement of control cam 112 and a variable thrust vector with horizontal movement of control cam 112, while operating rotor assembly 102 at a constant speed. Thus, even though only two pitch angle configurations of blades 108 have been shown in FIGS. 4B-4C, it should be understood by having ordinary skill in the art that blades 108 may have an infinite number of pitch angle configurations producing an infinite number of thrust magnitudes and thrust vectors, by moving control cam 112 eccentrically relative to concentric location 122.

Figure 5:
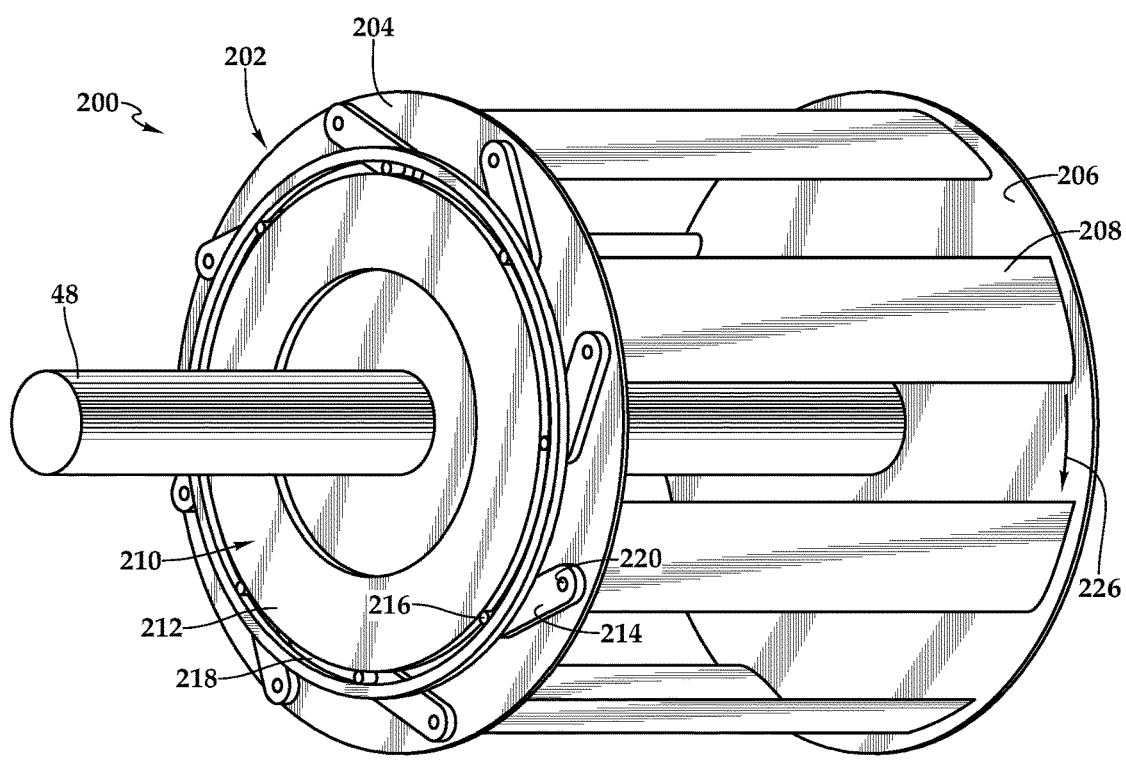
FIG. 5 is a perspective view of a cycloidal rotor for use in a tiltrotor aircraft having vertical lift and hover augmentation in helicopter flight mode in accordance with embodiments of the present disclosure.

In the illustrated embodiment, each blade 108 forms an acute angle with respect to the linkage 114 to which it is coupled. In this configuration, when control cam 112 is shifted down from concentric location 122 to eccentric location 124, airflow through rotor assembly 102 is from the top to the bottom, which generates a vertical thrust in the up direction, as discussed herein. The magnitude of the thrust generated by cycloidal rotor 28A is determined by factors including the magnitude of the eccentricity applied to control cam 112, the rotational speed of rotor assembly 102, the cross sectional shape of blades 108, the pitch angle configuration of blades 108, the number of blades 108 and other factors known to those having ordinary skill in the art. It should be noted that the cycloidal rotors of the present disclosure may take a variety of forms and may operate in a variety of ways. For example, as illustrated in FIG. 5 of the drawings, a propulsion assembly of the present disclosure is depicted as cycloidal rotor 200. In this embodiment, cycloidal rotor 200 rotates in the clockwise direction, the blades form obtuse angles with respect to the linkages, the control cam does not rotate with the rotor assembly and the control cam is shifted in same direction in which thrust is generated.

Cycloidal rotor 200 includes a rotor assembly 202 including driver plates 204, 206 which are coupled to and are rotatable about a longitudinal axis by a drive shaft 48, which is part of a drive system used to provide rotational energy to rotor assembly 202 and is, for example, coupled to engine 40 and/or engine 60 of tiltrotor aircraft 10. Rotor assembly 202 includes a plurality of blades 208 that are each rotatably coupled between driver plates 204, 206. As illustrated, blades 208 are disposed radially outwardly from the longitudinal axis such that blades 208 follow a generally circular path of travel when rotor assembly 202 rotates about the longitudinal axis. Cycloidal rotor 200 includes a control assembly 210 that is coupled to each blade 208. Control assembly 210 is part of an actuation system used to adjust the thrust output and thrust vector of rotor assembly 202. In the illustrated embodiment, control assembly 210 includes a control cam 212 that is eccentrically shiftable relative to rotor assembly 202 but does not rotate with rotor assembly 202. Control assembly 210 also includes a plurality of linkages 214 that are slidably coupled to control cam 212 via follower pins 216 in a continuous follower slot 218 of driver plate 204 and fixably coupled to blades 208 via driver pins 220 that extend through linkage holes (not visible) of driver plate 204.

When rotor assembly 202 is rotated by drive shaft 48 and control cam 212 is positioned concentrically with rotor assembly 202, follower pins 216 move through continuous follower slot 218 in a concentric manner. In this state, blades 208 are in a neutral configuration wherein blades 208 have a substantially zero pitch during the entire revolution of rotor assembly 202. In this neutral configuration, blades 208 have a substantially zero angle of attack and therefore produce little or no thrust. To produce thrust, blades 208 are rotated relative to driver plates 204, 206 in response to shifting control cam 212 eccentrically relative to rotor assembly 202. When control cam 212 is position eccentrically relative to rotor assembly 202 and rotor assembly 202 is rotated by drive shaft 48, follower pins 216 travel an eccentric path through continuous follower slot 218, which cyclically pivots linkages 214 and cyclically rotates blades 208 relative to driver plates 204, 206. In this configuration, as each blade 208 follows the generally circular path of travel, the blades transition between positive pitch, zero pitch, negative pitch, zero pitch and back to positive pitch during each revolution of rotor assembly 202. As illustrated, blades 208 have an airfoil cross section and travel in a clockwise direction as indicated by arrow 226. In addition, each blade 208 forms an obtuse angle with respect to the linkage 214 to which it is coupled. In this configuration, when control cam 212 is shifted up from the concentric location, airflow through rotor assembly 202 is from the top to the bottom, which generates a vertical thrust in the up direction, as discussed herein.

Referring next to FIGS. 6A-6C of the drawings, a variable thrust operation of cycloidal rotor 200 will now be described. As discussed herein, tiltrotor aircraft 10 includes a plurality of propulsion assemblies with one propulsion assembly, preferably in the form of a cycloidal rotor 200, embedded within each of a plurality of channels, such as channel 56a, extending between upper surface 18a and lower surface 18b of wing 18, which is depicted in cross section. In the illustrated configuration of FIG. 6A, the control cam of cycloidal rotor 200 is positioned in the concentric location. In this state, the blades are in a neutral configuration wherein the blades have a substantially zero pitch during the entire revolution of cycloidal rotor 200. In this neutral configuration, the blades have a substantially zero angle of attack and therefore produce little or no thrust. Nonetheless, some air may pass through cycloidal rotor 200 as indicated by low-density intake airflow arrows 230 and low-density discharge airflow arrows 232. For the airplane flight mode of tiltrotor aircraft 10 without covers 30 in place to close the channels, having cycloidal rotor 200 rotating in the no thrust configuration may be preferred to shutting down cycloidal rotor 200 as a nonrotating unit may generate an undesirable drag force while a rotating unit allows for suitable airflow therethrough, as shown in FIG. 6A. The rotating speed of a non thrust-producing unit can be optimized for passive airflow therethrough by the flight control system of tiltrotor aircraft 10.

When it is desired to obtain vertical thrust from cycloidal rotor 200, the control cam may be shifted up from a concentric location 234 to an eccentric location 236, as seen in FIG. 6B. In this configuration, as each blade follows the generally circular path of travel, the blades have a pitch angle configuration wherein the blades transition between positive pitch, zero pitch, negative pitch, zero pitch and back to positive pitch during each revolution of cycloidal rotor 200. As illustrated, the blades have an airfoil cross section and travel in a counterclockwise direction. As each blade approaches the intake of channel 56a, the blades have progressively greater positive pitch reaching a maximum positive pitch proximate axis 238. Thereafter, as each blade retreats from the intake, the blades have progressively lesser positive pitch reaching zero pitch proximate axis 240. As each blade approaches the discharge of channel 56a, the blades have progressively greater negative pitch reaching a maximum negative pitch proximate axis 238. Thereafter, as each blade retreats from the discharge, the blades have progressively lesser negative pitch, reaching zero pitch proximate axis 240. Each blade repeats this cycle on each revolution of cycloidal rotor 200. As the blades follow the generally circular path of travel with the cyclically varying angle of attack, air passes through cycloidal rotor 200 gaining energy as indicated by low-density intake airflow arrows 242 and medium-density discharge airflow arrows 244 with the resultant thrust indicated by small arrow 246. Operating each of the wing mounted cycloidal rotors of tiltrotor aircraft 10 with the blades in the illustrated pitch angle configuration of FIG. 6B may be desirable for vertical lift augmentation for tiltrotor aircraft 10.

The magnitude of thrust generated by cycloidal rotor 200 is determined by factors including the magnitude of the eccentricity applied to the control cam. When it is desired to increase the vertical thrust from cycloidal rotor 200, the control cam may be shifted up from eccentric location 236 to a further eccentric location 248, as seen in FIG. 6C. In this configuration, as each blade follows the generally circular path of travel, the blades have a pitch angle configuration wherein the blades transition between positive pitch, zero pitch, negative pitch, zero pitch and back to positive pitch during each revolution of cycloidal rotor 200. As each blade approaches the intake of channel 56a, the blades have progressively greater positive pitch reaching a maximum positive pitch proximate axis 238, which is greater than the maximum positive pitch in the pitch angle configuration of the blades in FIG. 6B. Thereafter, as each blade retreats from the intake, the blades have progressively lesser positive pitch reaching zero pitch proximate axis 240. As each blade approaches the discharge of channel 56a, the blades have progressively greater negative pitch reaching a maximum negative pitch proximate axis 238, which is greater than the maximum negative pitch in the pitch angle configuration of the blades in FIG. 6B. Thereafter, as each blade retreats from the discharge, the blades have progressively lesser negative pitch, reaching zero pitch proximate axis 240. Each blade repeats this cycle on each revolution of cycloidal rotor 200. As the blades follow the generally circular path of travel with the cyclically varying angle of attack, air passes through cycloidal rotor 200 gaining energy as indicated by low-density intake airflow arrows 250 and high-density discharge airflow arrows 252 with the resultant thrust indicated by large arrow 254, which is greater than the thrust indicated by small arrow 246 in FIG. 6B. Operating each of the wing mounted cycloidal rotors of tiltrotor aircraft 10 with the blades in the illustrated pitch angle configuration of FIG. 6C may be desirable for vertical lift augmentation for tiltrotor aircraft 10. In addition, operating certain of the wing mounted cycloidal rotors of tiltrotor aircraft 10 with the blades in the pitch angle configuration of FIG. 6B and other of the wing mounted cycloidal rotors of tiltrotor aircraft 10 with the blades in the pitch angle configuration of FIG. 6C may be desirable for hover augmentation for tiltrotor aircraft 10, for example, in roll control (see FIG. 3B).

Referring next to FIGS. 7A-7C of the drawings, a thrust vectoring operation of cycloidal rotor 200 will now be described. The thrust vector generated by cycloidal rotor 200 is determined by factors including the eccentricity applied to the control cam. When it is desired to change the thrust vector of cycloidal rotor 200, the control cam may be shifted left from eccentric location 248, as seen in FIG. 7B, to an eccentric location 256, as seen in FIG. 7A. In this configuration, as each blade follows the generally circular path of travel, the blades have a pitch angle configuration wherein the blades transition between positive pitch, zero pitch, negative pitch, zero pitch and back to positive pitch during each revolution of cycloidal rotor 200. As each blade approaches and passes the intake of channel 56a, the blades have progressively greater positive pitch reaching a maximum positive pitch approximately thirty degrees after axis 238. Thereafter, as each blade retreats from the intake, the blades have progressively lesser positive pitch reaching zero pitch approximately thirty degrees after axis 240. As each blade approaches and passes the discharge of channel 56a, the blades have progressively greater negative pitch reaching a maximum negative pitch approximately thirty degrees after axis 238. Thereafter, as each blade retreats from the discharge, the blades have progressively lesser negative pitch, reaching zero pitch approximately thirty degrees after axis 240. Each blade repeats this cycle on each revolution of cycloidal rotor 200. As the blades follow the generally circular path of travel with the cyclically varying angle of attack, air passes through cycloidal rotor 200 gaining energy as indicated by low-density intake airflow arrows 258 and a gradient of discharge airflow arrows 260 with a high-density portion to the right, which has a resultant thrust vector indicated by large arrow 262. Operating each of the wing mounted cycloidal rotors of tiltrotor aircraft 10 with the blades in the illustrated pitch angle configuration of FIG. 7A may be desirable for vertical lift augmentation and hover augmentation for tiltrotor aircraft 10, for example, in fore/aft control (see FIG. 3D).

When it is desired to change the thrust vector of cycloidal rotor 200, the control cam may be shifted right from eccentric location 256, as seen in FIG. 7A, to an eccentric location 264, as seen in FIG. 7C. In this configuration, as each blade follows the generally circular path of travel, the blades have a pitch angle configuration wherein the blades transition between positive pitch, zero pitch, negative pitch, zero pitch and back to positive pitch during each revolution of cycloidal rotor 200. As each blade approaches the intake of channel 56a, the blades have progressively greater positive pitch reaching a maximum positive pitch approximately thirty degrees before axis 238. Thereafter, as each blade retreats from the intake, the blades have progressively lesser positive pitch reaching zero pitch approximately thirty degrees before axis 240. As each blade approaches the discharge of channel 56a, the blades have progressively greater negative pitch reaching a maximum negative pitch approximately thirty degrees before axis 238. Thereafter, as each blade retreats from the discharge, the blades have progressively lesser negative pitch, reaching zero pitch approximately thirty degrees before axis 240. Each blade repeats this cycle on each revolution of cycloidal rotor 200. As the blades follow the generally circular path of travel with the cyclically varying angle of attack, air passes through cycloidal rotor 200 gaining energy as indicated by low-density intake airflow arrows 266 and a gradient of discharge airflow arrows 268 with a high-density portion to the left, which has a resultant thrust vector indicated by large arrow 270. Operating each of the wing mounted cycloidal rotors of tiltrotor aircraft 10 with the blades in the illustrated pitch angle configuration of FIG. 7B may be desirable for vertical lift augmentation and hover augmentation for tiltrotor aircraft 10, for example, in fore/aft control (see FIG. 3D). In addition, operating certain of the wing mounted cycloidal rotors of tiltrotor aircraft 10 with the blades in the pitch angle configuration of FIG. 7A and other of the wing mounted cycloidal rotors of tiltrotor aircraft 10 with the blades in the pitch angle configuration of FIG. 7C may be desirable for vertical lift augmentation and hover augmentation for tiltrotor aircraft 10, for example, in yaw control (see FIG. 3C).

Even though the wing mounted cycloidal rotors of the present disclosure have been described and depicted as being oriented as a single row within a wing of a tiltrotor aircraft, it should be understood by those have ordinary skill in the art that wing mounted cycloidal rotors could have other orientations. For example, referring to FIGS. 8A-8B in the drawings, a tiltrotor aircraft is schematically illustrated and generally designated 310. Aircraft 310 includes a fuselage 312, a wing mount assembly 314 that is rotatable relative to fuselage 312 and a tail assembly 316 having control surfaces operable for horizontal and/or vertical stabilization during forward flight. A swept wing 318 is supported by wing mount assembly 314 and rotates with wing mount assembly 314 relative to fuselage 312 to enable tiltrotor aircraft 310 convert to a storage configuration. Together, fuselage 312, tail assembly 316 and wing 318 as well as their various frames, longerons, stringers, bulkheads, spars, ribs, skins and the like may be considered to be the airframe of tiltrotor aircraft 310.

Figure 8A:
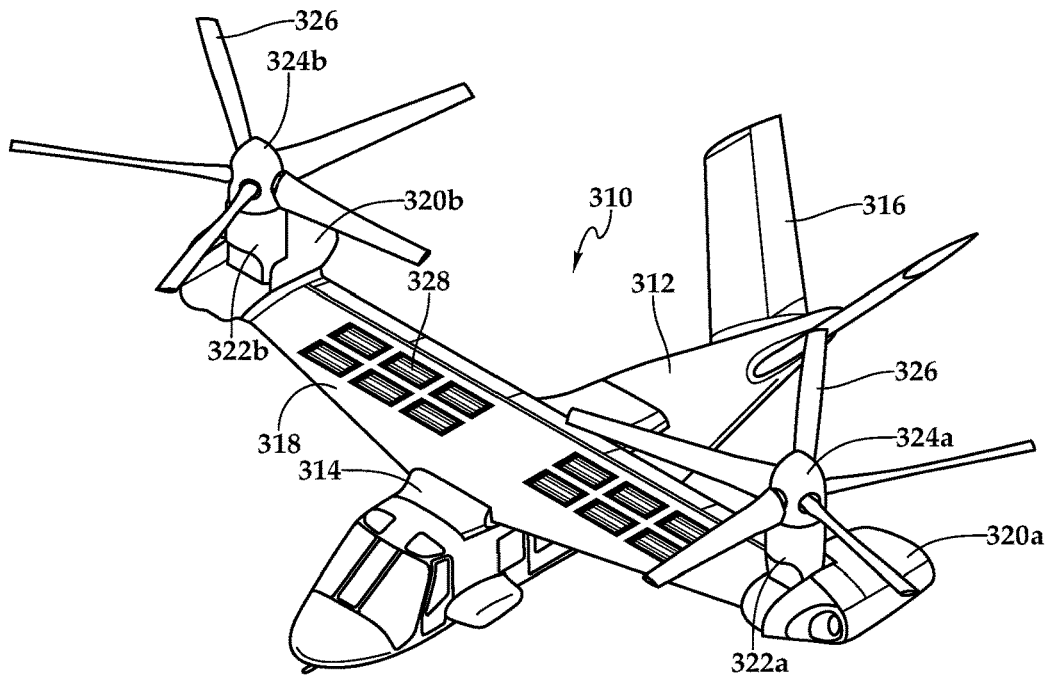
FIGS. 8A-8B are schematic illustrations of a tiltrotor aircraft having vertical lift and hover augmentation in helicopter flight mode in accordance with embodiments of the present disclosure.
Figure 8B:
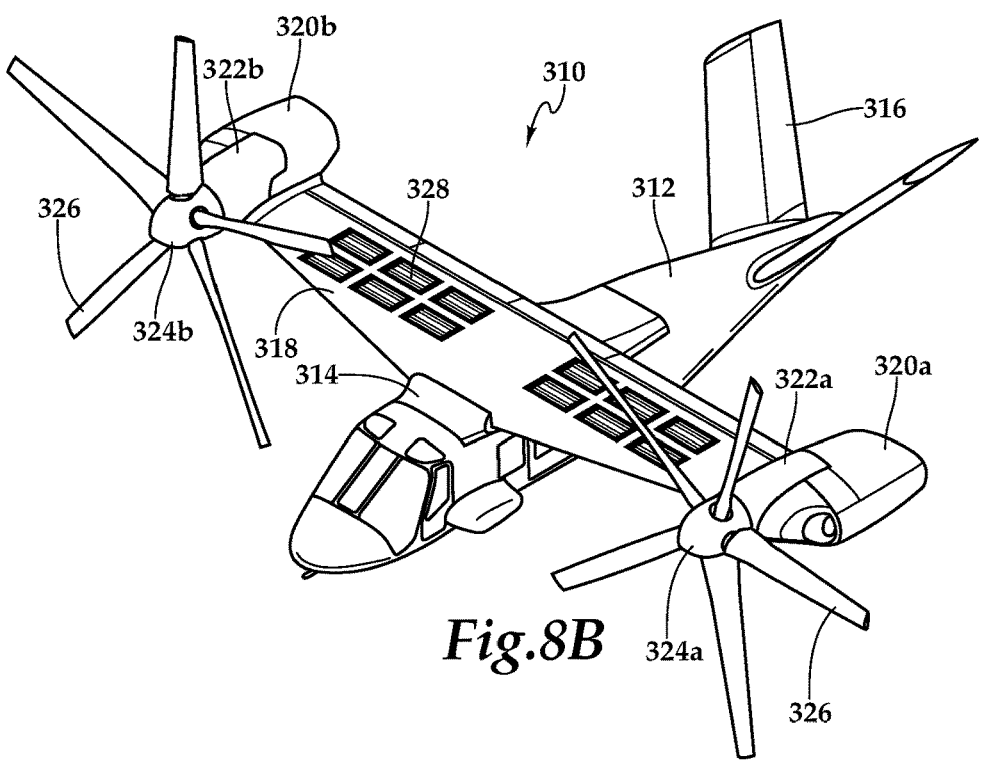

Located proximate the outboard ends of wing 318 are fixed nacelles 320a, 320b, each of which preferably houses an engine and a fixed portion of a drive system. A pylon assembly 322a is rotatable relative to fixed nacelle 320a and wing 318 between a generally vertical orientation, as best seen in FIG. 8A, a generally horizontal orientation, as best seen in FIG. 8B. Pylon assembly 322a includes a rotatable portion of the drive system and a proprotor assembly 324a that is rotatable responsive to torque and rotational energy provided via the engine and drive system. Likewise, a pylon assembly 322b is rotatable relative to fixed nacelle 320b and wing 318 between a generally vertical orientation, as best seen in FIG. 8A, a generally horizontal orientation, as best seen in FIG. 8B. Pylon assembly 322b includes a rotatable portion of the drive system and a proprotor assembly 324b that is rotatable responsive to torque and rotational energy provided via the engine and drive system. In the illustrated embodiment, proprotor assemblies 324a, 324b each include five proprotor blades 326. Distributed in arrays within wing 318 is a plurality of propulsion assemblies depicted as cycloidal rotors 328. In the illustrated embodiment, six cycloidal rotors 328 form a two by three array located in wing 318 to the left side of fuselage 312 and six cycloidal rotors 328 form a two by three array located in wing 318 to the right side of fuselage 312. It should be understood by those having ordinary skill in the art, however, that each side of wing 318 could alternatively have a different number of cycloidal rotors in a different array or a different relative configuration.

Cycloidal rotors 328 provide vertical lift and hover augmentation to tiltrotor aircraft 310 in the helicopter flight mode. Vertical thrust generated by cycloidal rotors 328 is operable to provide vertical lift augmentation tiltrotor aircraft 10. Thrust vectoring by cycloidal rotors 328 is operable to provide hover augmentation to tiltrotor aircraft 10 such as roll control, yaw control, fore/aft control and/or lateral control if certain of cycloidal rotors 328 are positioned in the chordwise direction. In addition, cycloidal rotors 328 are able to generated a pitch moment due to the fore/aft offset between forward mounted cycloidal rotors 328 and aft mounted cycloidal rotors 328 such that vertical thrust generated by cycloidal rotors 328 is operable to provide hover augmentation to tiltrotor aircraft 10 in the form of pitch control.

FIG. 8A illustrates aircraft 310 in helicopter or VTOL flight mode, in which proprotor assemblies 324a, 324b are rotating in a substantially horizontal plane to provide a lifting thrust, such that aircraft 310 flies much like a conventional helicopter, with the addition of cycloidal rotors 328 providing vertical lift and hover augmentation. FIG. 8B illustrates aircraft 310 in airplane or forward flight mode, in which proprotor assemblies 324a, 324b are rotating in a substantially vertical plane to provide a forward thrust enabling wing 318 to provide a lifting force responsive to forward airspeed, such that aircraft 310 flies much like a conventional propeller driven aircraft. In FIG. 8B, cycloidal rotors 328 are exposed and may be operated if desired to pass air through wing 318 at a desire rate or may be allowed to freewheel responsive to airflow across wing 318. Alternatively, covers (not shown) may be hydraulically actuated to provide aerodynamic surfaces substantially coincident with the upper and lower skins of wing 318 when it is not desired to have cycloidal rotors 328 exposed.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tiltrotor aircraft having a helicopter flight mode and an airplane flight mode, the tiltrotor aircraft comprising: a fuselage; a wing supported by the fuselage, the wing having upper and lower surfaces with a plurality of channels extending therebetween; a plurality of cycloidal rotor propulsion assemblies each having a plurality of blades, each propulsion assembly disposed within one of the plurality of channels of the wing; at least two pylon assemblies, each rotatably coupled to the wing to selectively operate the tiltrotor aircraft between the helicopter flight mode and the airplane flight mode, each pylon assembly including a mast and a proprotor assembly operable to rotate with the mast to generate thrust; and at least one engine providing torque and rotational energy to the proprotor assemblies and the propulsion assemblies.

2. The tiltrotor aircraft as recited in claim 1 wherein the propulsion assemblies provide vertical lift and hover augmentation to the proprotor assemblies in the helicopter flight mode.

3. The tiltrotor aircraft as recited in claim 1 wherein each of the propulsion assemblies is operable to provide a vertical thrust.

4. The tiltrotor aircraft as recited in claim 1 wherein each of the propulsion assemblies is operable to provide a variable thrust.

5. The tiltrotor aircraft as recited in claim 1 wherein each of the propulsion assemblies is operable to provide a variable thrust vector.

6. The tiltrotor aircraft as recited in claim 1 wherein the plurality of blades of each propulsion assembly has a generally circular path of travel and a plurality of pitch angle configurations.

7. The tiltrotor aircraft as recited in claim 1 wherein the propulsion assemblies are distributed generally spanwise within the wing.

8. The tiltrotor aircraft as recited in claim 1 wherein the plurality of propulsion assemblies further comprises a forward plurality of propulsion assemblies and an aft plurality of propulsion assemblies.

9. The tiltrotor aircraft as recited in claim 1 wherein the plurality of propulsion assemblies are operable to generate vertical thrust to augment the thrust of the proprotor assemblies in the helicopter flight mode.

10. The tiltrotor aircraft as recited in claim 1 wherein the propulsion assemblies are operable for thrust vectoring to provide hover augmentation in the helicopter flight mode.

11. The tiltrotor aircraft as recited in claim 1 wherein the plurality of propulsion assemblies is operable to provide roll control in the helicopter flight mode.

12. The tiltrotor aircraft as recited in claim 1 wherein the plurality of propulsion assemblies is operable to provide yaw control in the helicopter flight mode.

13. The tiltrotor aircraft as recited in claim 1 wherein the plurality of propulsion assemblies is operable to provide pitch control in the helicopter flight mode.

14. The tiltrotor aircraft as recited in claim 1 wherein the at least one engine further comprises at least one engine dedicated to the plurality of propulsion assemblies.

15. The tiltrotor aircraft as recited in claim 1 further comprising aerodynamic covers operable to close the channels of the wing.

16. A tiltrotor aircraft having a helicopter flight mode and an airplane flight mode, the tiltrotor aircraft comprising: a fuselage; a wing supported by the fuselage, the wing having upper and lower surfaces with a plurality of channels extending therebetween; a plurality of cycloidal rotor propulsion assemblies, each disposed within one of the channels of the wing; at least two pylon assemblies, each rotatably coupled to the wing to selectively operate the tiltrotor aircraft between the helicopter flight mode and the airplane flight mode, each pylon assembly including a mast and a proprotor assembly operable to rotate with the mast to generate thrust; and at least one engine providing torque and rotational energy to the proprotor assemblies and the propulsion assemblies; wherein, each of the propulsion assemblies has a plurality of blades that travels in a generally circular path and has a plurality of pitch angle configurations such that each propulsion assembly is operable to generate a variable thrust and a variable thrust vector, thereby providing vertical lift and hover augmentation to the proprotor assemblies in the helicopter flight mode.

17. The tiltrotor aircraft as recited in claim 16 wherein the plurality of propulsion assemblies is operable to provide roll control in the helicopter flight mode.

18. The tiltrotor aircraft as recited in claim 16 wherein the plurality of propulsion assemblies is operable to provide yaw control in the helicopter flight mode.

19. The tiltrotor aircraft as recited in claim 16 wherein the plurality of propulsion assemblies is operable to provide pitch control in the helicopter flight mode.

* * * * *